United States Patent
Schröder

[11] Patent Number: 5,934,420
[45] Date of Patent: Aug. 10, 1999

[54] DEVICE FOR RESILIENTLY SUSPENDING A PISTON ON A CLOSED-OFF HYDRAULIC COLUMN

[76] Inventor: Günter Schröder, Schillerstrasse 7, 66780 Siersburg, Germany

[21] Appl. No.: 08/828,384

[22] Filed: Mar. 28, 1997

[30] Foreign Application Priority Data

Mar. 28, 1996 [DE] Germany .............. 196 12 471

[51] Int. Cl.$^6$ ...................................... F16F 9/24
[52] U.S. Cl. .................. 188/297; 267/132; 280/283
[58] Field of Search .................... 188/297, 268, 188/284; 267/132, 64.11, 64.19, 64.26, 64.27, 219, 140, 220; 280/283, 287, 278; 297/215.13

[56] References Cited

U.S. PATENT DOCUMENTS

| | | | |
|---|---|---|---|
| 2,681,800 | 6/1954 | Taylor | 267/63 |
| 2,984,478 | 5/1961 | Westcott, Jr. | 188/268 X |
| 3,437,332 | 4/1969 | Lee | 188/268 X |
| 3,891,200 | 6/1975 | Schwarz | 267/140 |
| 3,968,862 | 7/1976 | Gorges et al. | 188/268 X |
| 5,667,234 | 9/1997 | Zirk et al. | 267/141 X |
| 5,704,626 | 1/1998 | Kesinger | 280/220 |

FOREIGN PATENT DOCUMENTS

1134254  8/1962  Germany .

*Primary Examiner*—Robert J. Oberleitner
*Assistant Examiner*—Pamela J. Lipka
*Attorney, Agent, or Firm*—Walter Ottesen

[57] ABSTRACT

A volume spring element 152 is located inside the piston 10 which is open to the cylinder 20. The spring element 152 is surrounded by hydraulic liquid on all sides except at its surface 1521 at which the element 152 is attached to the piston 10. When the hydraulic pressure increases, the volume spring element is compressed thereby decreasing its volume. When the hydraulic pressure decreases, the volume spring element expands again. When the hydraulic cylinder is closed off by a valve, then the hydraulic liquid in the piston 10 and in the cylinder 20 is disposed in a closed-off space or chamber. Axial pressures on the cylinder cause a pressure increase in the hydraulic medium. This causes the volume of the volume spring element to be decreased and the piston to be moved axially by the amount corresponding to the decrease of the equally large oil volume in the piston. With the reduction of the hydraulic pressure, the volume spring element expands again causing an axial movement of the piston in a direction out of the cylinder 20. The volume spring element effects the shock absorption of a saddle support which can be hydraulically positioned.

3 Claims, 1 Drawing Sheet

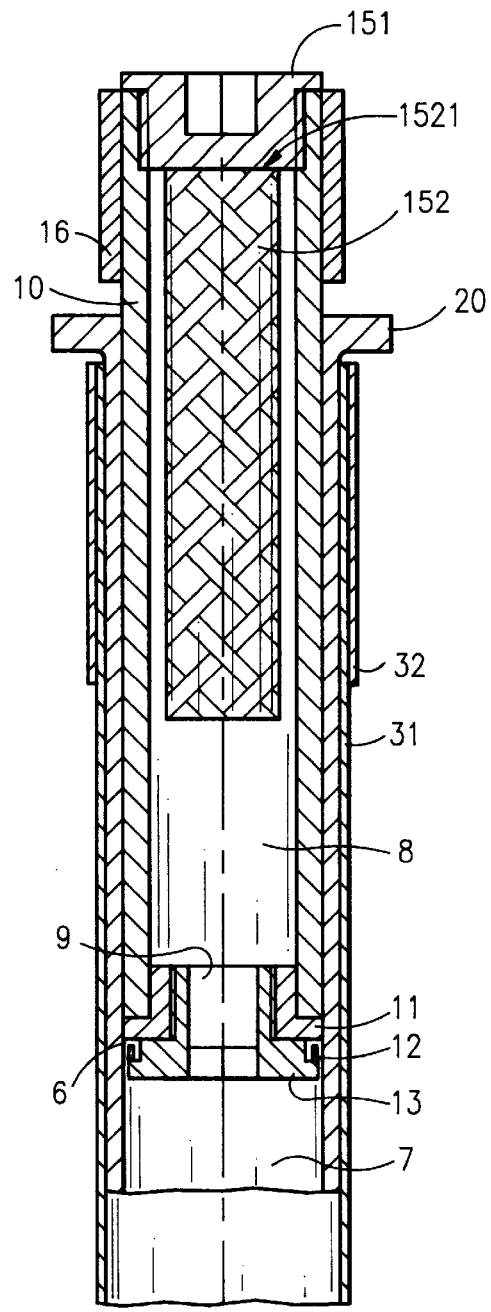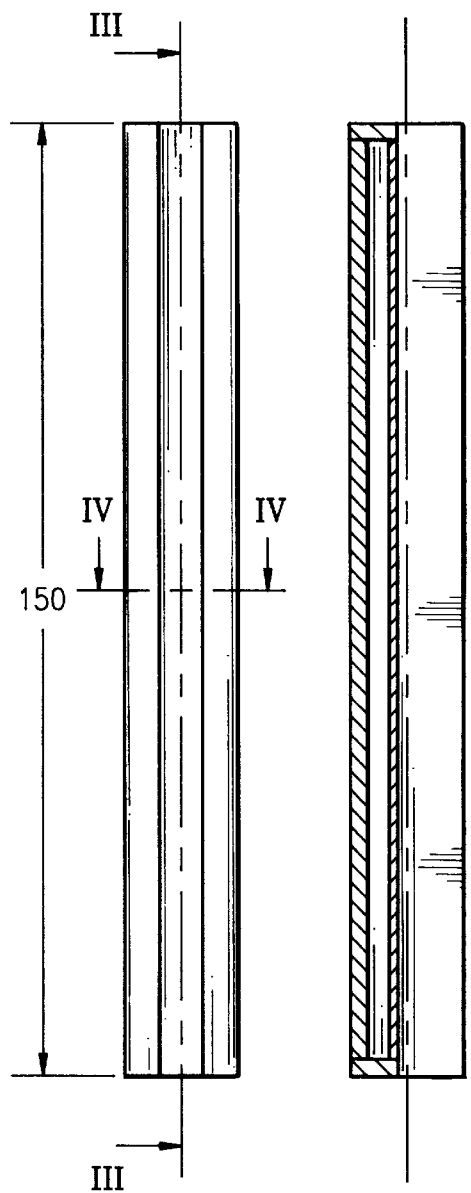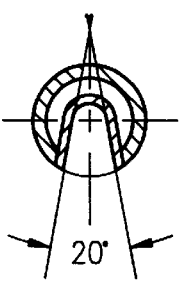
FIG. 1　FIG. 2　FIG. 3　FIG. 4

DEVICE FOR RESILIENTLY SUSPENDING A PISTON ON A CLOSED-OFF HYDRAULIC COLUMN

FIELD OF THE INVENTION

The invention relates to a device for resiliently suspending a piston on a hydraulic column which is enclosed within a cylinder. The invention relates especially to a device for resiliently suspending a saddle support for a bicycle.

BACKGROUND OF THE INVENTION

It is customarily desired that the piston in hydraulic equipment maintains its assumed position without moving when one or more valves are closed. The necessary preconditions to satisfy this situation are: noncompressible hydraulic mediums, conduits and vessels of unchanging volume, the absence of air and vapor in the space filled with hydraulic liquid and delimited by the piston. Impact loads acting upon the piston in its direction of movement are absorbed by the abrupt pressure increase of the hydraulic liquid and by the elastic deformation of the metal component parts. The resulting spring characteristic line of this hydraulic equipment is very steep and is virtually unnoticed by the rider.

U.S. patent application Ser. No. 08/740,350, filed Nov. 8, 1996, discloses a saddle support for bicycles which can be positioned hydraulically. In this way, saddles, with and without spring suspension, which are attached to a saddle support operating as a piston, can be positioned at the height required for ergonomic and safety reasons. However, impact loads caused by the ground surface and transmitted to the seat and spine of the rider via the bicycle cannot be absorbed in addition to those already absorbed by the tires and the suspension of the saddle. As can be seen in many devices available in the marketplace, additional shock absorption is desirable in bicycles equipped with tires of small diameter and saddles which are not spring suspended as well as for travel over an uneven road surface.

SUMMARY OF THE INVENTION

In view of the above, it is an object of the invention to improve an arrangement of the kind described in the above-identified patent application by providing the same with excellent suspension characteristics while at the same time permitting the arrangement to maintain its excellent positioning characteristics. It is also an object of the invention to provide excellent suspension characteristics for the saddle support of bicycles per se.

The device of the invention is for resiliently suspending a piston on a volume of hydraulic fluid. The device includes: a cylinder for holding the hydraulic fluid; a piston defining a longitudinal axis and being subjected to an impact load in the direction of the axis; the piston slidably engaging the cylinder; means for closing off the cylinder to prevent the hydraulic fluid from escaping therefrom; and, a reversible volume compressible body disposed within the hydraulic fluid for responding to the impact load by contracting and by expanding when the load is removed thereby resiliently suspending the piston in the cylinder.

BRIEF DESCRIPTION OF THE DRAWINGS

The invention will now be described with reference to the drawings wherein:

FIG. 1 is a schematic of the device according to the invention for resiliently suspending a piston on a closed-off hydraulic column;

FIG. 2 is a side elevation view of a volume spring element according to a feature of the invention;

FIG. 3 is a section view of the volume spring element of FIG. 2 taken along line III—III thereof; and, FIG. 4 is a section view of the volume spring element of FIG. 2 taken along line IV—IV thereof.

DESCRIPTION OF THE PREFERRED EMBODIMENTS OF THE INVENTION

Referring to FIG. 1, a saddle clamp 16 for a bicycle saddle (not shown) is attached to piston 10 so that the piston 10 functions as a saddle support. A cylinder 20 is seated in a tube 31 of a bicycle frame and the tube 31 is held in a connecting sleeve 32 of the bicycle frame.

The piston 10 is open facing the cylinder 20 and is provided with a removable piston cover at the end of the piston receiving the saddle. In this embodiment, the piston cover is in the form of a threaded piston cap 151. The piston cap 151 carries a volume spring element 152. The cylinder wall surface and exposed circular end surface of element 152 are immersed in the hydraulic medium filing spaces 8 and 7. FIG. 1 shows the volume spring element 152 as a component made of an elastomer. For this reason, an increase of the hydraulic pressure causes a decrease in the volume of the spring element 152.

The sum of the volumes of the volume spring element 152 and the hydraulic medium, which is not soluble in the element 152, determine the fill-level of the cylinder as well as that of the piston 10 and thereby the position of the piston.

As soon as the hydraulic pressure varies due to the increase or decrease of outside forces (person seated on the saddle of a moving bicycle and/or shocks from a road surface), the volume of the volume spring element 152 varies as well, causing the piston 10 to correspondingly slide up and down in the cylinder 20. In this manner, the device of the invention absorbs shock transmitted to the rider via the bicycle.

The volume spring element is reversibly elastically deformable and can be produced having different characteristic curves $dV=f(P_{hydr})$=(volume change=function of the hydraulic pressure in the cylinder and in the piston). This allows for harder or softer spring suspension of the saddle support (mounted on the piston 10) which can be hydraulically positioned as disclosed in the above-mentioned U.S. patent application Ser. No. 08/740,350, incorporated herein by reference.

A plug 11 is attached to the lower end of the piston 10 and a cap 13 is threadably connected to the plug. The cap 13 defines a flow-through channel 9 to permit the hydraulic liquid to pass between the inner space 8 of piston 10 and the inner space 7 of the cylinder 20. The plug 11 and the cap 13 conjointly define an annular space 6 for accommodating a seal 12 which prevents leakage of the hydraulic liquid to the ambient.

FIG. 2 shows an example of the volume spring element 152 made, for example, of spring steel. Other materials for element 152 can also be used such as aluminum or an elastomer provided the material is reversibly elastically deformable under hydraulic pressure generated within the cylinder 20. The lower end (not shown) of cylinder 20 is closed off so that the hydraulic liquid cannot escape therefrom.

FIGS. 3 and 4 show respective section views of the volume spring element 152.

It is understood that the foregoing description is that of the preferred embodiments of the invention and that various changes and modifications may be made thereto without departing from the spirit and scope of the invention as defined in the appended claims.

What is claimed is:

1. A device for resiliently suspending a piston on a volume of hydraulic fluid, the device comprising:

a cylinder for holding said hydraulic fluid;

a piston defining a longitudinal axis and being subjected to an impact load in the direction of said axis;

said piston slidably engaging said cylinder;

means for closing off said cylinder to prevent said hydraulic fluid from escaping therefrom;

a reversible volume compressible body disposed within said hydraulic fluid for responding to said impact load by contracting and by expanding when said load is removed thereby resiliently suspending said piston in said cylinder; and, said compressible body defining a longitudinal axis and being a closed hollow elongated body having a non-circular cross section when viewed in section perpendicular to said longitudinal axis.

2. A device for resiliently suspending a piston on a volume of hydraulic fluid, the device comprising:

a cylinder for holding said hydraulic fluid;

a piston defining a longitudinal axis and being subjected to an impact load in the direction of said axis;

said piston slidably engaging said cylinder;

means for closing off said cylinder to prevent said hydraulic fluid from escaping therefrom;

a reversible volume compressible body disposed within said hydraulic fluid for responding to said impact load by contracting and by expanding when said load is removed thereby resiliently suspending said piston in said cylinder;

said piston being hollow to define a cavity opening into the interior of said cylinder so as to permit said hydraulic fluid to flow between said cavity and said interior of said cylinder; and, said reversible volume compressible body being mounted in said cavity.

3. The device of claim 2, said reversible volume compressible body being an elongated body mounted in said cavity in the direction of said longitudinal axis; and, said reversible volume compressible body and said piston conjointly defining an annular space so as to permit said hydraulic fluid to fill said annular space and be in contact with most of the surface of said reversible volume compressible body.

* * * * *